United States Patent [19]

Martin et al.

[11] Patent Number: 4,664,290

[45] Date of Patent: May 12, 1987

[54] METHOD AND APPARATUS FOR PRECISE POSITIONING OF A SEED DISK IN A SEED METER

[75] Inventors: James C. Martin, Davenport, Iowa; Jay H. Olson, Rock Island, Ill.

[73] Assignee: Deere & Company, Moline, Ill.

[21] Appl. No.: 704,859

[22] Filed: Feb. 25, 1985

[51] Int. Cl.⁴ .............................................. A01C 7/04
[52] U.S. Cl. ................................ 221/211; 29/526 R; 111/78; 221/241; 301/113; 301/114; 403/17; 403/379
[58] Field of Search ...................... 221/211, 241, 242; 111/34, 77, 78; 301/113, 114, 128; 403/17, 259, 379; 29/526 R

[56] References Cited

U.S. PATENT DOCUMENTS

| | | | |
|---|---|---|---|
| 722,909 | 3/1903 | Runge . | |
| 738,417 | 9/1903 | Danserau | 301/114 |
| 1,331,235 | 2/1920 | Bristow . | |
| 2,235,457 | 3/1941 | Lorimor | 301/128 |
| 2,472,742 | 6/1949 | Brown | 301/128 |
| 2,562,720 | 7/1951 | Ickes | 301/128 |
| 2,591,253 | 4/1952 | Grismore | 301/128 |
| 2,685,478 | 8/1954 | Booth | 301/128 |
| 2,695,733 | 11/1954 | Rutter | 222/288 |
| 3,214,996 | 11/1965 | Bono | 74/568 |
| 3,342,273 | 9/1967 | Crane | 403/379 |
| 3,412,908 | 11/1968 | Ferrault | 222/194 |
| 3,608,787 | 9/1971 | Grataloup | 222/342 |
| 3,638,829 | 2/1972 | Frase et al. | 221/241 |
| 3,741,437 | 6/1973 | Ward | 221/219 |
| 3,796,346 | 3/1974 | Ribouleau | 221/211 |
| 3,841,529 | 10/1974 | Hatcher | 221/277 |
| 3,888,387 | 6/1975 | Deckler | 221/278 |
| 3,990,606 | 11/1976 | Gugenhan | 221/211 |
| 3,999,690 | 12/1976 | Deckler | 222/194 |
| 4,047,638 | 9/1977 | Harrer et al. | 111/77 |
| 4,074,830 | 2/1978 | Adams | 221/266 |
| 4,101,232 | 7/1978 | Haapala | 403/261 |
| 4,450,979 | 5/1984 | Deckler | 221/263 |

FOREIGN PATENT DOCUMENTS 2517758 4/1976 Fed. Rep. of Germany .
63057 5/1864 France ............................... 301/114

OTHER PUBLICATIONS

Printed Specification-Fieldhouse-1909-1 page.
3-page "Operating Instructions and Parts List" of Nodet Gougis on pneumasem II precision seed drill, dated Feb. 1979.
Page 15 and 99 from an Allis-Chalmers publication on a seed meter, no date.
"Operator's Manual" on White 5100 Seed Boss Planter, dated Feb. 1980.

Primary Examiner—L. J. Paperner
Assistant Examiner—P. McCoy Smith

[57] ABSTRACT

In a seed meter in which a seed disk is rotatably mounted within a housing, a method and apparatus are provided for positioning the seed disk within the housing so that the peripheral portion of the seed disk is located a desired, relatively uniform distance from an adjacent peripheral portion of the housing. A shaft having a threaded outer portion is rotatably mounted within the housing and a hub having a threaded aperture therein is positioned on and turned relative to the threaded outer portion of the shaft to begin advancing the threaded aperture onto the shaft. The seed disk is then mounted on the hub, following which rotation of the hub relative to the shaft is continued in a direction to advance the hub along the shaft toward the housing until a gap of desired size exists between the peripheral portion of the seed disk and the peripheral portion of the housing. The hub is then releasably secured on the shaft by inserting a pin through an aperture in the shaft and through an opposite pair of a plurality of slots spaced about the hub.

14 Claims, 12 Drawing Figures

METHOD AND APPARATUS FOR PRECISE POSITIONING OF A SEED DISK IN A SEED METER

BACKGROUND OF THE INVENTION

1. Field of the Invention

The present invention relates to seed meters in which a seed disk is rotatably mounted within the meter housing, and more particularly to methods and apparatus for rotatably positioning a rotatably mounted seed disk at a desired location within the housing of a seed meter.

2. History of the Prior Art

It is known in the field of agricultural equipment and machinery to provide seed meters which meter or dispense individual seeds into a furrow in the ground at a controlled rate in conjunction with associated apparatus for creating the furrow and then moving loose soil back into the furrow after the seeds have been deposited therein. There are various different types of seed meters including the mechanical type in which individual seeds are plucked from a seed mass and discharged from the meter for deposit within the furrow by mechanical devices. Still other types of seed meters are of the air type in which a pressure differential is employed, typically in conjunction with a rotating seed disk or similar device, to pick up seeds from the seed mass and then discharge them from the meter into the furrow. Air seed meters can be of the positive air flow type in which the seeds are picked up by the seed disk and held thereon by blowing air. Air seed meters can also be of the vacuum type in which a reduced pressure is communicated to the seed disk in a manner enabling the disk to pick up and carry individual seeds thereon with the assistance of the reduced pressure.

An example of a vacuum seed meter is provided by a co-pending application, Ser. No. 546,834, abandoned, Lundie et al, filed Oct. 31, 1983 and commonly assigned with the present application. The Lundie et al application describes a vacuum seed meter in which a rotating seed disk is mounted within the hollow interior of a housing so as to have a seed mass disposed on one side thereof and a source of reduced pressure coupled to a vacuum chamber at the opposite side of the disk. The reduced pressure communicates with a plurality of seed cells recessed in the side of the disk facing the seed mass via apertures extending through the thickness of the disk from the bottoms of the cells. The reduced pressure assists the cells in picking up individual seeds from the mass and transporting them to a seed discharge area sealed off from the reduced pressure to provide for release of the seeds carried in the seed cells. The released seeds fall through a discharge chute into a furrow in the ground formed by an opener unit mounted in conjunction with the seed meter.

In the vacuum seed meter described in the Lundie et al application the seed mass on one side of the rotating seed disk is formed by seeds falling from a hopper mounted above the seed meter into a seed chamber formed at the side of the seed disk by the shape of the hollow interior of the meter housing. The outer peripheral portion of the seed disk is disposed closely adjacent an outer peripheral portion of the hollow interior of the meter housing to prevent seeds in the seed chamber from escaping to the outside of the seed meter.

A co-pending application, Ser. No. 546,829, now U.S. Pat. No. 4,613,056, Olson, filed Oct. 31, 1983 and commonly assigned with the present application, describes an arrangement of the vacuum seed meter of the Lundie et al application in which a relatively small space is formed between the outer peripheral portion of the seed disk and the adjacent peripheral portion of the hollow interior of the housing on the side of the seed disk where the seed mass resides. The space defines a gap between the seed disk and the housing which is large enough to permit expulsion of debris from the interior of the meter housing while at the same time preventing the escape of the seeds themselves including in particular seeds of relatively small size. The debris which is eliminated by passing through such gap includes dust, dirt and unwanted particles of relatively small size such as broken seed particles or chips and the like. As described in the Olson application the outer peripheral portion of the seed disk may be provided with a succession of fins disposed on the opposite sides of recesses therebetween to agitate and encourage the expulsion of debris which may accumulate at the interface between the seed disk and adjacent portions of the housing interior.

In the arrangement described in the Olson application, it is desirable not only that the gap between the seed disk and the housing interior be of desired nominal size but also that such gap be of relatively uniform size about the entire outer peripheral portion of the seed disk. A gap which is too large may result in expulsion of the seeds themselves, particularly those seeds of smaller size, in addition to the debris. Conversely, a gap which is too small may not allow proper expulsion of the debris. A non-uniform gap tends to provide non-uniform expulsion of debris and the unwanted expulsion of seeds at locations where the gap becomes unduly large.

In the particular vacuum seed meters described in the Lundie et al and Olson applications, the seed disk is mounted for rotation within the hollow interior of the meter housing by a shaft rotatably mounted within the housing and having a seed disk mounting hub disposed on the outer end thereof so as to mount the seed disk for rotation with the shaft. An example of the seed disk mounting hub is provided by a co-pending application, Ser. No. 546,831, now abandoned, Webber, filed Oct. 31, 1983 and commonly assigned with the present application. During manufacture of such seed meters, the seed disk mounting hub is typically mounted on the outer end of the shaft such as by a cotter pin, following which the opposite end of the shaft is pressed into the outer race of a bearing within the housing to achieve an interference fit therebetween. The pressing of the shaft into the bearing race is carried out using equipment which has been programmed to provide a desired gap between the seed disk and the housing. Unfortunately, this process makes it difficult to form such gap within the close tolerances desired. Moreover, once the shaft is pressed into the bearing race, it can be very difficult to relocate the shaft to provide desired disk-housing spacing, particularly where the shaft installation equipment is not available. Such a problem may arise, for example, in the field where the farmer discovers that the gap between the seed disk and the housing is too large or too small. Another problem which commonly exists is lack of perpendicularlity. As a result of misalignment of the shaft upon pressing into the bearing race, or possibly due to other factors, the central axis of the shaft and thus of the seed disk itself may not be precisely perpendicular to the plane of the peripheral portion of the housing interior which interfaces with the outer peripheral portion of the seed disk. This may result in a non-uniform gap with its attendant disadvantages as previously noted.

Accordingly, it would be advantageous to provide an improved method and apparatus for rotatably mounting a seed disk within the hollow interior of a housing of a seed meter.

It would furthermore be advantageous to provide an improved method and apparatus for rotatably mounting a seed disk within the hollow interior of a housing of a seed meter in a manner which provides both a gap of desired size therebetween and a gap which is relatively uniform in size about the entire outer peripheral portion of the seed disk.

BRIEF DESCRIPTION OF THE INVENTION

These and other objects are accomplished in accordance with the invention by disk mounting methods and apparatus in which a seed disk mounting hub can be secured to a shaft at any of a plurality of different locations along a portion of the length of the shaft following installation of the shaft in the meter housing. Moreover, the fit between the hub and the shaft is provided with enough tolerance or play to compensate for a lack of perpendicularity that may exist between the seed disk and the housing.

The shaft is first installed in the seed meter housing such as by pressing an end thereof into position in a bearing race within the housing. Thereafter, the hub is initially positioned on the opposite end of the shaft and the seed disk is then mounted on the hub. The hub and included seed disk are then advanced along the shaft toward the housing interior until a gap of desired size between the outer peripheral portion of the seed disk and the adjacent outer peripheral portion of the housing interior is achieved. The hub is then secured to the shaft so that the desired gap is thereafter maintained. The seed disk is removed from the hub if necessary to permit securing of the hub to the shaft following which the disk is again mounted on the hub. A predetermined amount of tolerance or play is provided in the fit of the hub on the shaft so that the axis of rotation of the hub and the seed disk can form relatively small angles with the central axis of the shaft. This small amount of play allows the axis of rotation of the seed disk to shift slightly as necessary so as to maintain the gap between the seed disk and the housing relatively uniform.

In a preferred embodiment of a method and apparatus according to the invention, an outer portion of the shaft opposite the housing interior is threaded as is an aperture within a central portion of the hub. Following installation of the shaft in the housing and with the seed disk removed from the hub, the central aperture in the hub is threaded onto the threaded outer portion of the shaft to initially position the hub on the shaft. The seed disk is then mounted on the hub, following which the hub and included seed disk are rotated relative to the shaft in a direction to advance the hub along the length of the shaft toward the housing interior. When a gap of desired size between the seed disk and the housing is achieved, the hub is secured on the shaft so that such gap is thereafter maintained. Securing of the hub to the shaft is accomplished by removing the seed disk from the hub, following which a pin is inserted through an aperture in the shaft and through an opposite pair of a plurality of slots in the hub which extend about the threaded aperture. The pin is releasably held in place by way of a curved portion thereof having an outer curved end which resiliently seats within a different one of the plurality of slots in the hub. With the hub thereby releasably secured in place on the shaft so as to provide a gap of desired size between the seed meter and the housing, the seed disk is again mounted on the hub.

The threaded aperture in the hub is slightly larger than the threaded outer portion of the shaft. This provides a small amount of tolerance or play between the threaded aperture of the hub and the shaft, enabling the axis of rotation of the hub and the seed disk to pivot slightly and form small angles with the central axis of the housing. This small amount of play causes the seed disk to rotate in a manner which provides a uniform gap between the outer peripheral portion of the seed disk and the adjacent peripheral portion of the housing.

BRIEF DESCRIPTION OF THE DRAWING

The foregoing and other objects, features and advantages of the invention will be apparent from the following more particular description of a preferred embodiment of the invention, as illustrated in the accompanying drawings, in which.

DETAILED DESCRIPTION

FIGS. 1–6 illustrate a vacuum seed meter 10 useful in describing the methods and apparatus according to the invention. The vacuum seed meter 10 is similar to that shown and described in the previously referred to copending application Ser. No. 546,834 of Lundie et al which is incorporated herein by reference. Accordingly, those portions of the vacuum seed meter 10 not directly relating to the present invention are described only briefly hereafter.

The vacuum seed meter 10 has a generally cylindrical housing 12 comprised of a first half shell 14 and an opposite, mating second half shell 16. The second half shell 16 is coupled to the first half shell 14 by a hinge 18 permitting the second half shell 16 to be closed over the first half shell 14 to close the housing 12. A clasp 20 mounted on the first half shell 14 on a side thereof opposite the hinge 18 is secured to the second half shell 16 to hold the housing 12 in the closed position.

Figure 3:
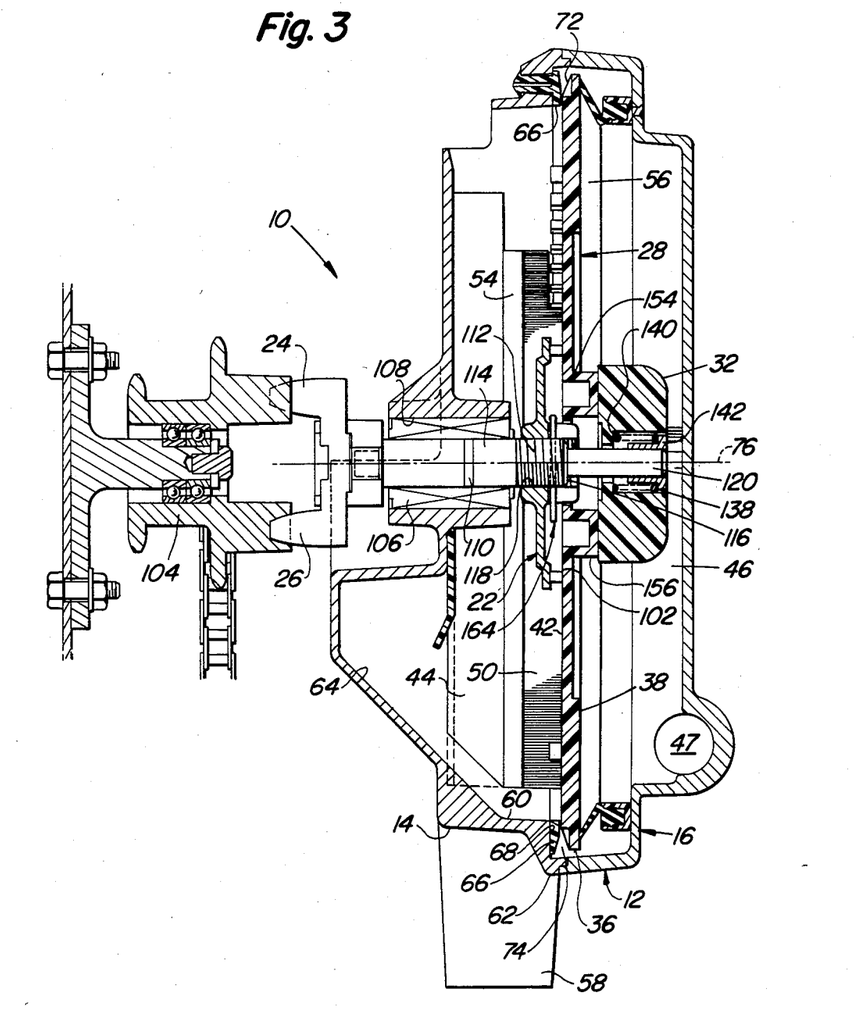
FIG. 3 is a sectional view of the seed meter of FIG. 1 with the meter in a closed position.
Figure 4:
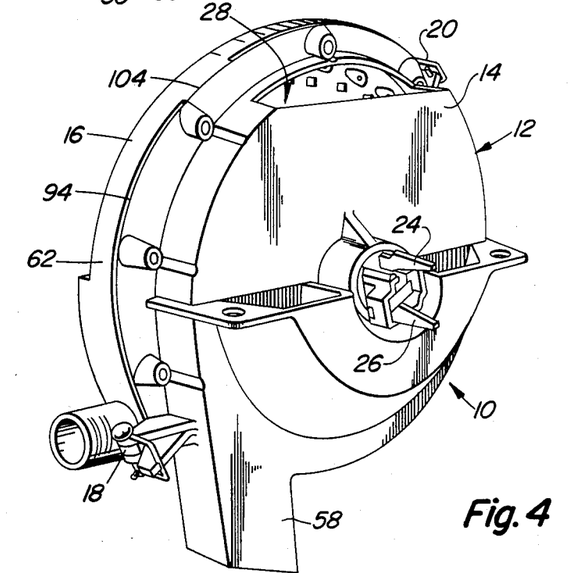
FIG. 4 is a left rear perspective view of the seed meter of FIG. 1 with the meter in the closed position.

A hub 22 is rotatably mounted within the first half shell 14 of the housing 12 at the center of the first half shell 14. As seen in FIGS. 3 and 4 a pair of lugs 24 and 26 are disposed on the outside of the first half shell 14 at the back of the housing 12. The lugs 24 and 26 are engaged by a driving arrangement shown in FIG. 3 to rotatably drive the hub 22.

Figures 9, 10, 11, 12:
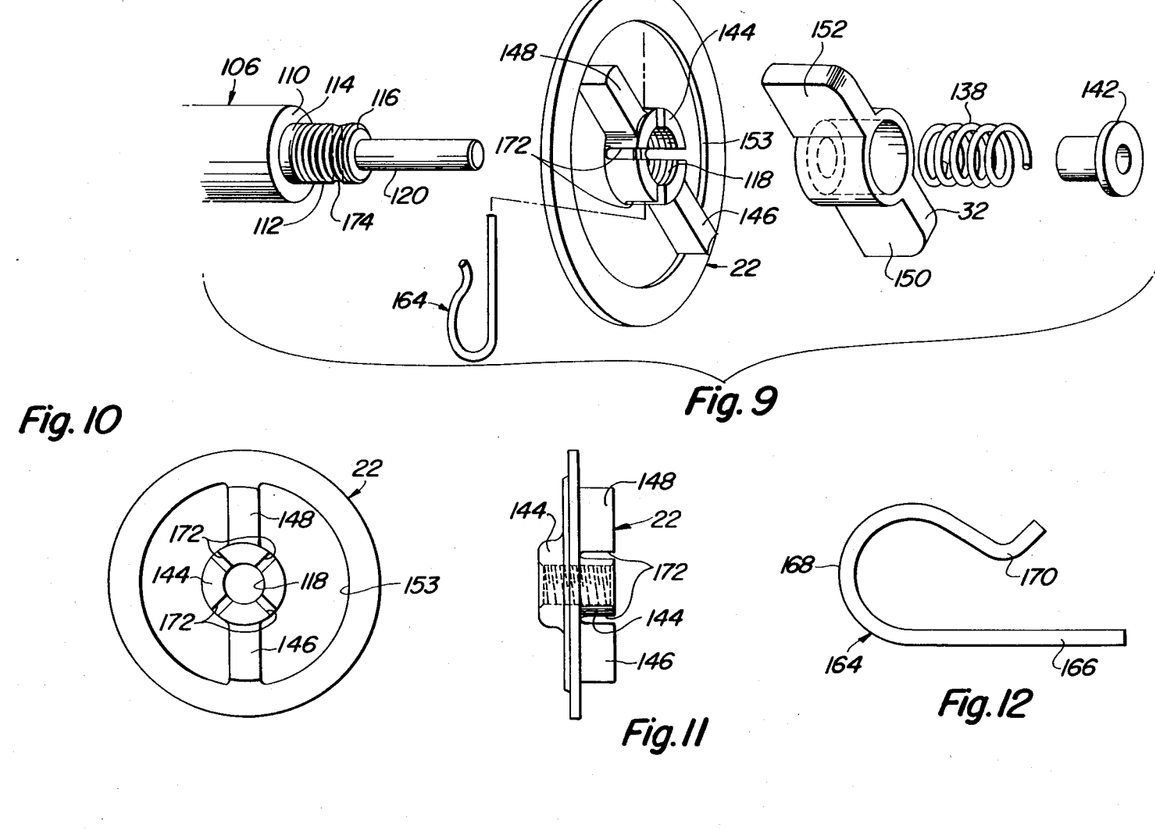
FIG. 9 is an exploded perspective view of a portion of the seed meter of FIGS. 1–6 including a shaft, hub and pin which are included in the apparatus utilized in the method of FIG. 8.
FIG. 10 is a front view of the hub of FIG. 9.
FIG. 11 is a side view of the hub of FIG. 9.
FIG. 12 is an enlarged front view of the pin of FIG. 9.

The seed meter 10 includes a seed disk 28 which has an elongated aperture 30 at the center thereof. The seed disk 28 is mounted for rotation on the hub 22 by passing a handle 32 which is mounted on the hub 22 through the elongated aperture 30 to seat the seed disk 28 on the hub 22. The handle 32 is then rotated into a position to lock the seed disk 28 on the hub 22. This arrangement for mounting the seed disk 28 on the hub 22 which is also shown in FIG. 9 is similar to an arrangement described in detail in previously referred to co-pending application Ser. No. 546,831 of Webber, which application is incorporated herein by reference.

The seed disk 28 has a plurality of apertures 34 therein arranged in a circumferential array adjacent and inside of a circular outer edge 36 of the seed disk 28. Each of the apertures 34 extends through the thickness of the seed disk 28 between a first side 38 of the seed disk 28 and the bottom of one of a plurality of seed cells 40 formed in an opposite second side 42 of the seed disk 28.

With the seed disk 28 mounted on the hub 22 and the second half shell 16 closed over the first half shell 14, the seed disk 28 divides the hollow interior of the cylindrical housing 12 into a seed chamber 44 between the seed disk 28 and the first half shell 14 and a vacuum chamber 46 between the seed disk 28 and the second half shell 16. A vacuum source is coupled by a vacuum port 47 in the second half shell 16 to create a reduced pressure within the vacuum chamber 46 adjacent the first side 38 of the seed disk 28. The reduced pressure communicates with the seed cells 40 formed in the second side 42 of the seed disk 28 via the apertures 34.

Figure 1:
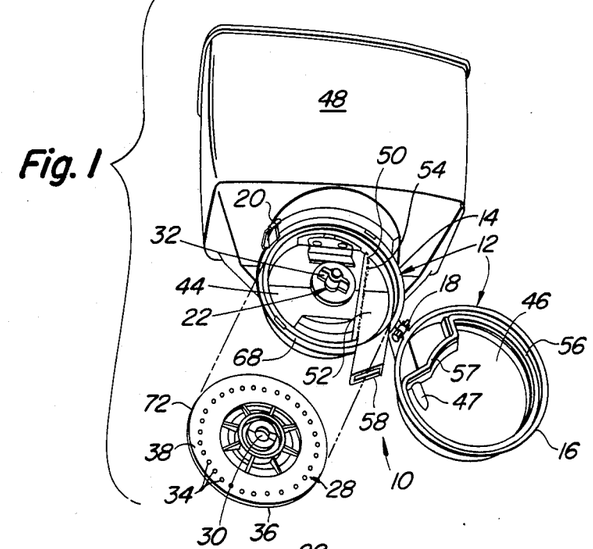
FIG. 1 is a perspective view of a seed meter having apparatus for the precise positioning of the seed disk therein in accordance with the invention, the seed meter being shown in an open position together with the seed disk.

As shown in FIG. 1 the first half shell 14 of the cylindrical housing 12 is mounted at the base of a seed hopper 48 for containing seeds to be metered by the vacuum seed meter 10. Seeds from the seed hopper 48 flow into the seed chamber 44 within the first half shell 14 where they form a seed mass against the second side 42 of the seed disk 28. As the hub 22 is rotatably driven so as to rotate the seed disk 28, the seed cells 40 agitate, accelerate and then capture individual seeds therein as they move through the seed mass within the seed chamber 44. As each seed cell 40 rises out of the seed mass, the seed contained therein is held in place by the reduced pressure within the vacuum chamber 46 which communicates with the seed via the aperture 34. The reduced pressure holds the seed in place in the seed cell 40 until the seed cell 40 passes across a divider brush 50. The divider brush 50 extends across the interior of the first half shell 14 and defines a seed discharge area 52 which is separated from the seed chamber 44 and the seed mass contained therein by the divider brush 50 and a divider wall 54 from which the brush 50 is mounted. As the seed cell 40 enters the seed discharge area 52, the effects of the reduced pressure from within the vacuum chamber 46 are cut off. This is due to the shape of a vacuum seal 56 which is mounted on the inside of the second half shell 16 and which extends into contact with the first side 38 of the seed disk 28. A portion 57 of the vacuum seal 56 extends inwardly from the region adjacent the circumference of the second half shell 16 to isolate the seed discharge area 52 from the reduced pressure. As the reduced pressure is cut off from each seed cell 40, the seed contained therein falls out of the seed cell 40 under the influence of gravity. The seed falls through a seed discharge chute 58 at the bottom of the first half shell 14 to the ground below.

Referring to FIG. 3 the seeds from the seed hopper 48 shown in FIG. 1 form the seed mass within the lower part of the seed chamber 44. The seeds of the seed mass reside on an inner surface 60 of a generally circular outer edge 62 of the generally cylindrical housing 12. The seeds also reside against the second side 42 of the seed disk 28 as well as an opposite inner wall 64 within the first half shell 14. As the seed meter 10 is used, seed chips, broken seeds, dirt and other debris begin to form within the seed chamber 44. Most of such debris is drawn through the apertures 34 in the seed disk 28 by the reduced pressure in the vacuum chamber 46. Much of the remaining debris settles on the inner surface 60 at the second side 42 of the seed disk 28.

Figure 2:
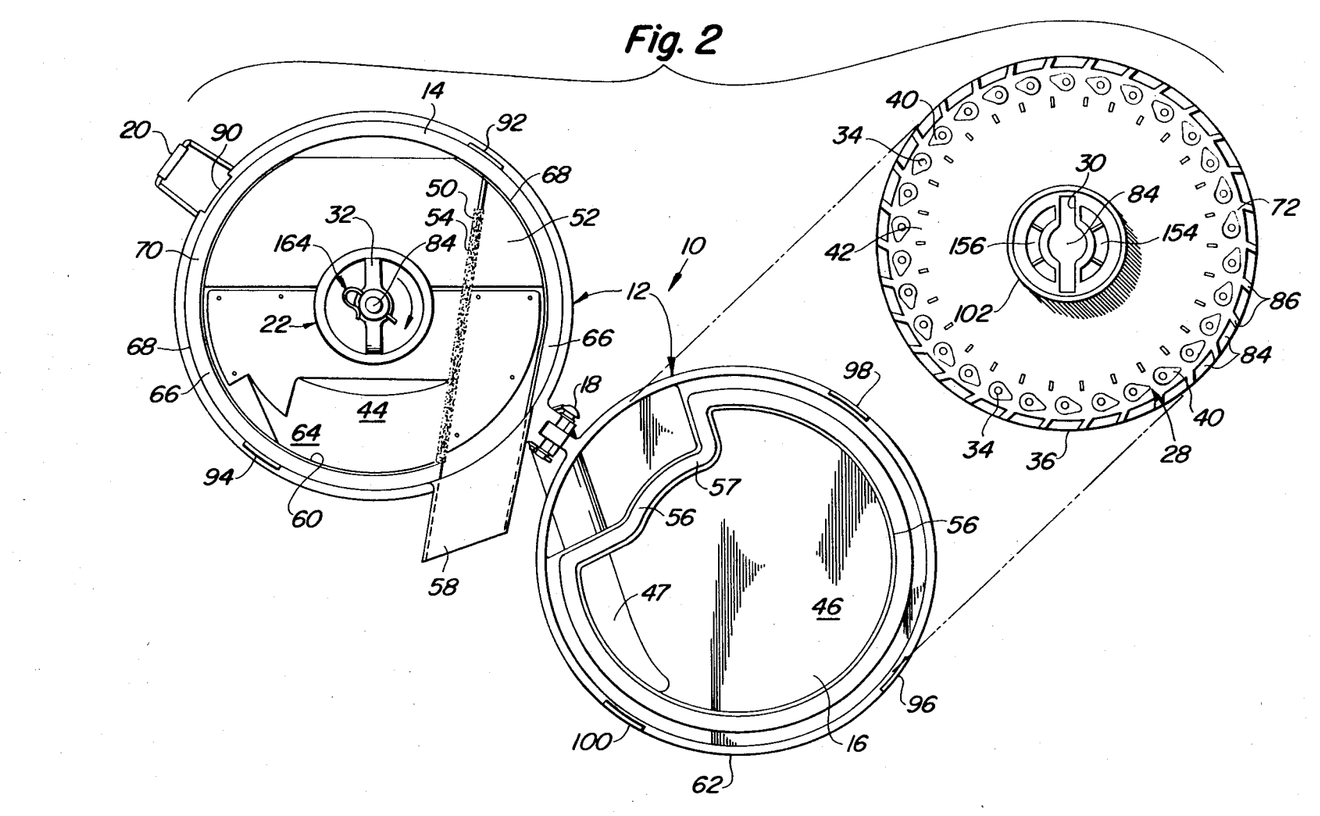
FIG. 2 is a plan view of the seed meter of FIG. 1 with the meter in the open position and showing the reverse side of the seed disk.

The debris which settles within the seed chamber 44 is eliminated by an arrangement which is described in greater detail in previously referred to co-pending application Ser. No. 546,829 of Olson, which application is incorporated herein by reference. Such arrangement includes a cleanout and seed sealing member 66 mounted on a flat surface of circular configuration comprising an outer peripheral portion 68 of the first half shell 14 of the housing 12. As seen in FIGS. 1 and 2 the cleanout and seed sealing members 66 is of elongated configuration so as to extend around a substantial portion of the circumference of the outer edge 62 of the housing 12. The cleanout and seed sealing member 66 is interrupted only by the seed discharge chute 58 at the bottom of the seed discharge area 52.

The cleanout and seed sealing member 66 has an outer surface 70 which extends along the length of the member 66 adjacent an outer peripheral portion 72 of the seed disk 28 in the region of the circular outer edge 36 so as to form a small gap 74 therewith. The cross-sectional shape of the cleanout and seed sealing member 66 is tapered such that the outer surface 70 thereof slopes gradually away from the outer peripheral portion 72 of the seed disk 28 with increasing distance from an axis of rotation 76 about which the seed disk 28 rotates.

Figure 5:
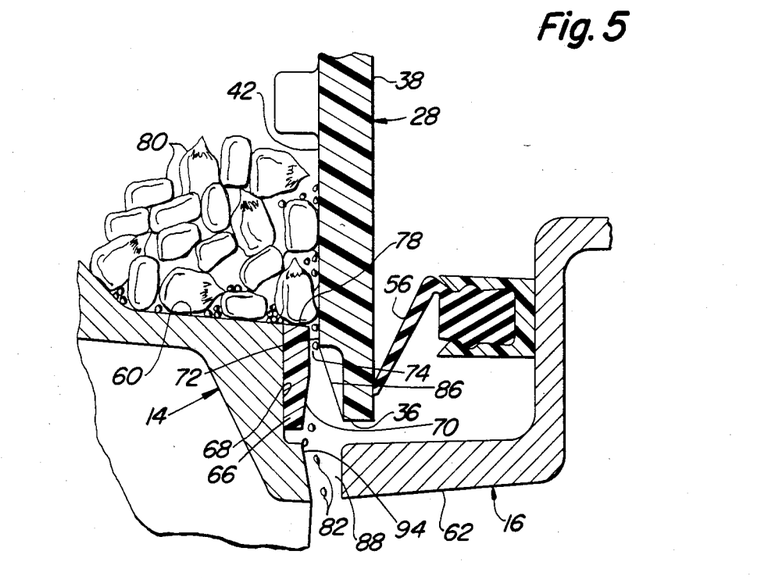
FIG. 5 is a sectional view of a portion of the seed meter of FIG. 1 illustrating the small gap between the outer peripheral portion of the seed disk and the adjacent outer peripheral portion of the seed meter housing.

The size of the gap 74 adjacent an inner edge 78 of the cleanout and seed sealing member 66 should be small enough to be below the limited range of sizes of a particular type of seed being used within the seed meter 10. At the same time the size of the gap 74 should be large enough to freely pass most seed chips, broken seeds, dirt and other debris therethrough. Accordingly, the gap 74 facilitates cleanout of the interior of the seed chamber 44 while at the same time sealing the seeds therein. This is illustrated in FIG. 5 which shows both full seeds 80 and particles of debris 82 which can comprise seed chips, broken seeds or dirt.

Figure 6:
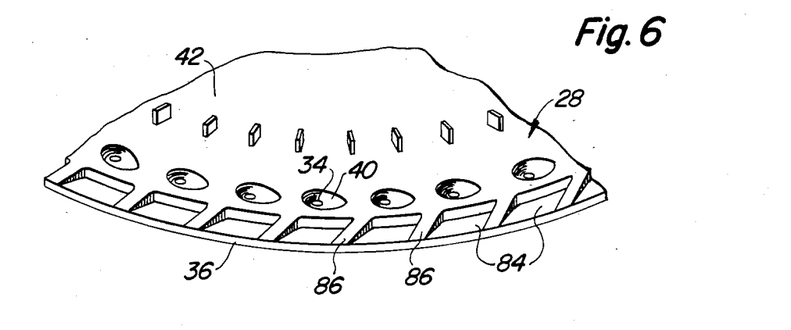
FIG. 6 is a perspective view of a portion of the outer edge of the seed disk illustrating a series of spaced-apart cavities and intervening ribs formed therein.

As shown in FIG. 6 the outer edge 36 of the seed disk 28 is provided with a series of spaced-apart cavities 84 therein. Each adjacent pair of the cavities 84 defines a rib 86 therebetween. The ribs 86 which are located at one side of the gap 74 and which have top surfaces that slope down from the side 42 of the seed disk 28 to a level equal to that of the cavaties 84 perform a scraping function by scraping any buildups of debris which may occur within the gap 74. The ribs 86 also agitate debris which enters the gap 74 to speed up the passage of such debris through the gap 74. This is aided by the intervening cavities 84 which receive some of the debris agitated by the ribs 86 and pass it freely and quickly out of the gap 74.

The cylindrical housing 12 has a slot 88 therein which extends around substantially the entire circumference of the generally circular outer edge 62 thereof. The slot 88 is formed by opposite edges of the first and second half shells 14 and 16 which are held in slightly spaced-apart relation by an arrangement of flange as shown in FIGS. 1,2 and 4. As best seen in FIG. 2, the first half shell 14 has a flange 90 at the outer edge thereof opposite the hinge 18 and located just outside of the cleanout and seed sealing member 66. An additional pair of flanges 92 and 94 are located on opposite sides of the first half shell 14 between the flange 90 and the hinge 18. The second half shell 16 has a flange 96 at the outer edge thereof opposite the hinge 18 and an opposite pair of intermediate flanges 98 and 100. The radial spacing of the flanges 96,98 and 100 from the center of the second half shell 16 is slightly greater than the radial spacing of the flanges 90,92 and 94 from the center of the first half shell 14. When the second half shell 16 is closed over the first half shell 14, the flange 96 extends just to the outside of and in engagement with the flange 90. In like fashion the flanges 98 and 100 extend just to the outside of and in contact with the flanges 92 and 94 respectively. The various flanges 90,92,94,96,98 and 100 combine with the action of the hinge 18 to hold the edges of the first and second half shells 14 and 16 apart by a small and relatively uniform distance which forms the slot 88.

It will therefore be seen that the slot 88 extends around substantially the entire circumference of the cylindrical housing 12 adjacent the cleanout and seed sealing member 66 and the outer edge 36 of the seed disk 28. The slot 88 facilitates expulsion of debris from the interior of the cylindrical housing 12 at virtually any location around the generally circular outer edge 62 of the housing 12, as illustrated in FIG. 5.

As shown in FIG. 2, the second side 42 of the seed disk 28 has an outwardly extending spacer ring 102 formed thereon. The spacer ring 102 is centered on the seed disk 28 so as to have the center thereof at the axis of rotation 76. The spacer ring 102 which extends into contact with the hub 22 and the seed disk 28 is mounted thereon determines the spacing of the seed disk 28 from the hub 22. Accordingly, once the hub 22 is actually fixed within the housing 12, the spacer ring 102 determines the nominal size of the gap 74 between the cleanout and seed sealing member 66 at the outer peripheral portion 68 of the housing 12 and the outer peripheral portion 72 of the seed disk 28. The seed disk 28 is normally usable only with a particular kind of seed having a predetermined limited size range. Thus the spacer ring 102 can be dimensioned to provide the desired size of the gap 74 to seal the seed which have sizes within the limited size range within the seed chamber 44 while at the same time providing escape of debris through the gap 74. When a different type of seed is to be used in the seed meter 10, the seed disk 28 is normally changed. The new disk is provided with a spacer ring 102 having a thickness corresponding to the size of the seeds which the new seed disk is designed to be used with. Seed disks 28 designed for use with larger seeds have spacer rings 102 with are relatively wide so as to position the second side 42 of the seed disk 28 a greater distance form the hub 22 to provide the gap 74 with a larger size. When smaller seeds are to be metered, the gap 74 must be reduced in size to seal the seeds within the seed chamber 44 and prevent the escape therefrom. This is accomplished by providing the seed disks 28 which are used with the smaller seeds with a narrower spacer ring 102 which positions the second side 42 of the seed disk 28 closer to the hub 22.

As previously noted in connection with FIG. 3, the seed disk 28 which is mounted on the hub 22 is rotatably driven by engagement of the lugs 24 and 26. The lugs 24 and 26 which are engaged by a rotating driving arrangement 104 shown in FIG. 3 are coupled to a bearing 106 journaled within a bore 108 within the first half shell 14 of the housing 12 and having an outer race 110. The hub 22 is coupled to the outer race 110 of the bearing 106 by a shaft 112 having a first end 114 pressed into the outer race 110 and an opposite threaded second end 116 for receiving a threaded central aperture 118 of the hub 22. The second end 116 of the shaft 112 terminates in a pin 120 extending into and rotatably and resiliently mounting the handle 32 thereon. As described hereafter the shaft 112 combines with the threaded central aperture 118 of the hub 22 to provide for the precise positioning of the seed disk 28 relative to the first half shell 14 of the housing 12. Such precise positioning enables the gap 74 between the outer peripheral portion 68 of the housing 12 and the outer peripheral 72 of the seed disk 28 to be of desired size and also to be relatively uniform in size around the entire outer edge 62 of the housing 12. As previously noted the proper expulsion of debris such as the particles 82 to the exclusion of the full seeds 80 is dependent upon the gap 74 being of desired uniform size.

Figures 7, 8:
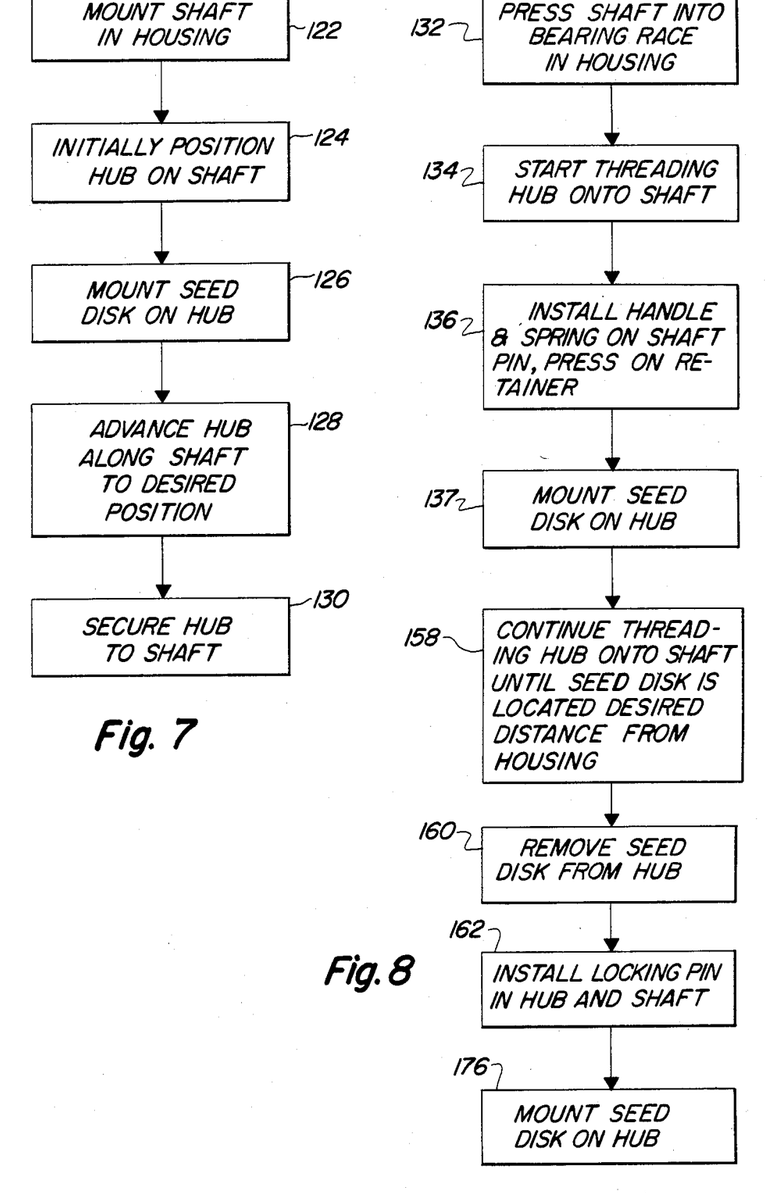
FIG. 7 is a block diagram of the successive steps of a method for precise positioning of a seed disk in a seed meter in accordance with the invention.
FIG. 8 is a block diagram of the successive detailed steps of a detailed example of the method of FIG. 7 for precise positioning of the seed disk in the seed meter of FIGS. 1–6.

FIG. 7 depicts the successive steps in a method of precisely positioning a seed disk within the housing of a seed meter in accordance with the invention.

The method of FIG. 7 begins with a first step 122 in which a shaft is mounted for rotation within the housing of the seed meter. In a following second step 124 a hub for mounting a seed disk is initially positioned on the shaft. The initial positioning of the hub on the shaft is accomplished with the seed disk removed from the hub in order to facilitate such initial positioning of the hub. Following initial positioning of the hub on the shaft, the seed disk is mounted on the hub in a following third step 126. With the seed disk mounted on the hub as provided for in the third step 126, the hub and included seed disk are advanced along the shaft to a desired position in a fourth step 128.

Movement of the hub and included seed disk along the shaft in accordance with the fourth step 128 of the method of FIG. 7 provides for variation in the position of the seed disk relative to the seed meter housing. Accordingly, the gap 74 between the outer peripheral portion 72 of the seed disk 28 and the outer peripheral portion 68 of the housing 12 can be provided with a selected size defined by the desired position of the hub on the shaft.

In a final fifth step 130 of the method of FIG. 7 the hub is secured to the shaft in the desired position. The securing of the hub to the shaft may be permanent but is preferably done in releasable fashion to enable the hub to be positioned at other desired locations on the shaft such as where it is desired to change the size of the gap 74.

FIG. 8 provides a detailed example of the method of FIG. 7 as applied to the particular vacuum seed meter 10 of FIGS. 1-6.

In the method of FIG. 8 the mounting of the shaft in the housing in accordance with the first step 122 of FIG. 7 is accomplished by a step 132 in which the shaft 112 is pressed into the outer race 110 of the bearing 106 in the first half shell 14 of the seed meter housing 12. This is an interference type of force fit which provides for the rotatable mounting of the shaft 112 within the housing 12. As shown in FIG. 3 the first end 114 of the shaft 112 is pressed into the outer race 110. This operation can be performed by hand but is preferably done by machine which provides for a more uniform and consistent mounting of the shaft 112. The bearing 106 with its outer race 110 and the shaft 112 are shown in FIG. 9 as well as in FIG. 3.

In a next step 134 of the method of FIG. 8 the second step 124 of the method of FIG. 7 is accomplished by starting to thread the hub 22 onto the shaft 112. As previously noted the outer surface of the shaft 112 is threaded along a portion thereof at the second end 116. The hub 22 has the threaded central aperture 118 therein. The step 134 is accomplished by engaging the hub 22 with the second end 116 of the shaft 112 and then turning the hub 22 in the appropriate direction to begin threading the hub 22 onto the shaft 112.

In a next step 136 of the method of FIG. 8 the apparatus used in mounting the seed disk 28 is installed on the hub 22 in preparation for mounting the seed disk 28 on the hub 22. In the disk mounting mechanism described in the previously referred to co-pending application Ser. No. 546,831 of Webber, the handle is rotatably and resiliently secured to the hub by a keeper mounted on the outer end of a pin extending from the hub and a coil spring encircling the pin and disposed between the keeper at one end thereof and an annular ridge within a central aperture in the handle at the other end thereof. A similar arrangement is as shown in FIGS. 3 and 9 where the handle 32 is rotatably and resiliently mounted on the pin 120 extending from the second end 116 of the shaft 112. As shown in FIG. 3 a coil spring 138 which encircles the pin 120 extends between an annular surface 140 within the handle 32 and a keeper 142 pressed onto an outer end of the pin 120.

Following the initial positioning of the hub 22 on the shaft 112 in the step 134, the step 136 is begun by installing the handle 32 on the pin 120. The pin 110 is inserted into the central aperture in the handle 32, following which the spring 138 is placed on the pin 120 and the keeper 142 is pressed onto the outer end of the pin 120. The handle 32 as so mounted is then ready to mount the seed disk 28 on the hub 22.

In a next step 137 of the method of FIG. 8 which corresponds to the third step 126 in the method of FIG. 7 the seed disk 28 is mounted on the hub 22. As shown in FIG. 9 the hub 22 which is generally disk shaped has a knob 144 at the center thereof which extends outwardly from the opposite sides of the disk-shaped portion of the hub 22 and has the threaded central aperture 118 therein. A pair of elongated elements 146 and 148 extend outwardly from the knob 144 on opposite sides thereof on the side of the hub 22 opposite the shaft 112 and receive opposite elongated elements 150 and 152 respectively of the handle 32 when the handle 32 is aligned with the elongated elements 146 and 148 of the hub 22. With the handle 32 in this position, the seed disk 28 is mounted on the hub 22 by inserting the handle 32 through the elongated aperture 30 in the seed disk 28 so that the spacer ring 102 of the seed disk 28 is seated on the disk-shaped portion of the hub 22 on an outer rim 153 with the knob 144 and the opposite elongated elements 146 and 148 disposed within the elongated aperture 30. With the seed disk 28 so positioned, the handle 32 is rotated relative to the hub 22 so that the opposite elongated elements 150 and 152 of the handle 32 ride up on opposite ramps 154 and 156 at the sides of the elongated aperture 30 against the resistance of the coil spring 138. The ramps 154 and 156 are shown in FIGS. 2 and 3. Eventually, the opposite elongated elements 150 and 152 of the handle 32 seat within recesses in the ramps 154 and 156, and the mounting of the seed disk 28 on hub 22 is completed with the seed disk 28 so mounted, the axis of rotation 76 thereof coincides with the central axis of the hub 22.

With the seed disk 28 mounted on the hub 22 as provided for in the step 137, a following step 158 in the method of FIG. 8 which corresponds to the fourth step 128 in the method of FIG. 7 is performed. The step 158 is performed by continuing to thread the hub 22 onto the shaft 112 until the seed disk 28 is a desired distance from the housing 12. More specifically, the hub 22 and the seed disk 28 which is mounted thereon are rotated about the shaft 112 in a direction to advance the hub 22 along the threaded portion of the shaft 112 until the gap 74 between the outer peripheral portion 72 of the seed disk 28 and the outer peripheral portion 68 of the first half shell 14 of the housing 12 has a desired size. Desired gap size can be determined by any appropriate technique including the use of a Spacer element. With such a spacer element placed against the outer surface 70 of the cleanout and seed sealing member 66, the hub 22 and seed disk 28 are rotated about the shaft 112 until the seed disk 28 contacts the spacer element, whereupon the spacer element is removed from the gap 74.

In a following step 160 of the method of FIG. 8 the seed disk 28 is removed from the hub 22. This is accomplished by rotating the handle 32 so that the opposite elongated elements 150 and 152 thereof slide down and then off of the ramps 154 and 156 on the seed disk 28 and onto the elongated elements 146 and 148 of the hub 22. With the handle 32 so aligned with the elongated elements 146 and 148 of the hub 22, the seed disk 28 may simply be pulled off of the hub 22. Removal of the seed disk 28 from the hub 22 in the step 160 is necessary in order to carry out a following step 162 in the method of FIG. 8.

In the step 162 of the method of FIG. 8 which corresponds to the final step 130 in the method of FIG. 7, the hub 22 is secured to the shaft 112 by installing a locking pin in the hub 22 and the shaft 112. Installation of the locking pin 164 releasably secures the hub 22 in the desired position on the shaft 112.

The locking pin 164 which is shown in FIGS. 3, 9 and 12 includes a straight portion 166 thereof and an adjoining curved portion 168. The curved portion 168 terminates in an outer curved end 170. Installation of the locking pin 164 on the hub 22 is accomplished by inserting the straight portion 166 thereof through an opposite pair of slots 172 in the knob 144 of the hub 22 and through an aperture 174 in the shaft 112. The aperture 174 is shown in dotted outline in FIG. 9. The knob 144 is provided with four of the slots 172. The slots 172 are located generally equidistantly or approximately 90 degrees apart about the threaded central aperture 118. The aperture 174 extends through the shaft 112 at the threaded portion thereof adjacent the second end 116 and is generally perpendicular to the central axis of the shaft 112.

Following the desired positioning of the seed disk 28 in the step 158 and the removal of the seed disk 28 from the hub 22 in the step 160, the hub 22 is rotated on the shaft 112 by a slight amount as necessary to align an opposite pair of the slots 172 with the aperture 174 prior to installation of the locking pin 164. Upon insertion of the straight portion 166 of the locking pin 164 through the aperture 174 and the opposite pair of the slots 172, the outer curved end 170 of the locking pin 164 engages a third one of the slots 172 located midway between the opposite pair of the slots 172 through which the straight portion 166 of the locking pin 164 extends. This biases the curved portion 168 of the locking pin 164 so as to resiliently seat the outer curved end 170 within the third one of the slots 172 to thereby releasably hold the locking pin 164 in the installed position. With the locking pin 164 so installed, the hub 22 cannot rotate on the shaft 112 and the seed disk 28 is held in the desired position.

As shown in FIG. 3 the spacer ring 102 of the seed disk 28 which seats on the rim 153 of the hub 22 provides a small amount of space between the hub 22 and the adjacent portion of the seed disk 28 in the region of the elongated aperture 30. This space accommodates those portions of the locking pin 164 that protrude from the knob 144.

In a final step 176 of the method of FIG. 8 the seed disk 28 is once again mounted on the hub 22. This is accomplished in essentially the same manner as previously described in connection with the step 137.

It will be appreciated from the method of FIG. 8 described in conjunction with the apparatus of FIGS. 1–6 and 9–12 that precise positioning of the seed disk 28 within the seed meter 10 is provided. The threaded outer surface of the shaft 112 in combination with the threaded central aperture 118 of the hub 22 and the locking pin 164 enables the hub 22 to be positioned at any of a plurality of selected positions along a portion of the length of the shaft 112. The shaft 112 can therefor be mounted within the outer race 110 of the bearing 106 without regard to precise positioning of the shaft 112 therein. The locking pin 164 provides for the releasable securing of the hub 22 on the shaft 112 when a desired position has been reached. Should it become necessary or desirable to reposition the seed disk 28 within the housing 12, it is only necessary to remove the locking pin 164 following removal of the seed disk 28 from the hub 22, after which the hub 22 can be rotated on the shaft 112 to a new desired position, with the seed disk 28 remounted thereon. With the seed disk 28 again removed, the locking pin 164 is then inserted through the aperture 174 and through an opposite pair of the slots 172 to releasably secure the hub 22 on the shaft 112 in the new position.

As seen in FIG. 3 the axis of rotation 76 of the seed disk 28 coincides with the central axis of the hub 22 when the seed disk 28 is mounted on the hub 22. The generally circular outer peripheral portion 68 of the housing 12 lies within a plane. The axis of rotation 76 is desirably perpendicular to this plane. Such perpendicularity provides for uniformity in the size of the gap 74. It frequently happens that the shaft 112 is installed in the outer race 110 so that the central axis of the shaft 112 is not precisely perpendicular to the plane of the outer peripheral portion 68 of the housing 12. This would normally result in non-uniformity of the gap 74, which previously noted is undesirable in that it provides for non-uniform retention of full seeds 80 within the housing and non-uniform expulsion of debris such as particles 82 from the housing 12.

In accordance with a feature of the invention, perpendicularity of the axis of rotation 76 of the seed disk 28 to the plane of the outer peripheral portion 68 of the housing 12 is maintained by providing a small amount of tolerance or play between the threaded portion of the shaft 112 and the threaded central aperture 118 of the hub 22. More specifically the outer diameter of the threaded portion of the shaft 112 is made smaller than the inner diameter of the threaded central aperture 118 of the hub 22 by an amount which provides the desired tolerance or play. This allows the axis of rotation 76 of the seed disk 28 to form relatively small angles with the central axis of the shaft 112 as necessary to maintain perpendicularity. It has been found that such tolerance or play allows the desired perpendicularity to be achieved upon rotation of the seed disk 28 relative to the housing 12 during operation of the seed meter 10. This is most likely due to aerodynamic effects in which the layer of air in the gap 74 causes the angle of the axis of rotation 76 to continually change relative to the plane of the outer peripheral portion 68 of the housing 12 as the seed disk 28 rotates so as to maintain uniformity of the gap 74.

While the invention has been particularly shown and described with reference to preferred embodiments thereof, it will be understood by those skilled in the art that various changes in form and details may be made therein without departing from the spirit and scope of the invention.

What is claimed is:

1. In a seed meter an arrangement for rotatably mounting a seed disk within a housing of the seed meter comprising the combination of a shaft rotatably mounted within the housing and having a length thereof extending outwardly from the housing and an aperture therein, a hub disposed on and movable along a portion of the length of the shaft and adapted to mount a seed disk thereon, the hub having an aperture therein receiving the shaft and a plurality of openings therein spaced around the aperture, and means for releasably securing the hub at any of a plurality of different locations along the portion of the length of the shaft, said means comprising a pin extending through the aperture in the shaft and an opposite pair of the openings in the hub.

2. The invention set forth in claim 1, wherein the pin has an outer end thereof engaged in one of the plurality of openings in the hub other than the opposite pair of openings in the hub through which the pin extends.

3. A seed meter comprising the combination of a housing having a peripheral portion thereof extending around a central axis, a shaft rotatably mounted within the housing and extending along the central axis, the shaft having a threaded outer surface thereof extending along a portion of the shaft from an outer end thereof opposite the housing, a hub having a threaded aperture therein receiving and threaded onto the threaded outer surface of the shaft, means for releasably locking the hub at one of a plurality of possible locations of the hub along the shaft, and a seed disk releasably mounted on the hub and having a peripheral portion thereof spaced apart from the peripheral portion of the housing by a distance determined by the location along the shaft at which the hub is releasably locked.

4. The invention set forth in claim 3, wherein the shaft has an aperture extending therethrough generally perpendicular to the central axis, the hub has a plurality of slots therein spaced around the threaded aperture therein, and the means for releasably locking comprises a pin extending through the aperture in the shaft and an opposite pair of the slots in the hub.

5. The invention set forth in claim 4, wherein the plurality of slots in the hub comprises four slots substantially equally spaced around the hub.

6. A seed meter comprising the combination of a housing having a peripheral portion thereof extending around a central axis, a shaft mounted within the housing and extending along the central axis, the shaft having a threaded outer surface thereof extending along a portion of the shaft from an outer end thereof opposite the housing, a hub having a threaded aperture therein receiving and threaded onto the threaded outer surface of the shaft and means for releasably locking the hub at one of a plurality of possible locations of the hub along the shaft, the hub having an axis extending through the threaded aperture and nominally coincident with the central axis and the threaded aperture being larger than the threaded outer surface of the shaft by an amount sufficient to permit movement of the hub relative to the shaft so that the axis of the hub forms small angles with the central axis.

7. A seed meter comprising the combination of a housing having a peripheral portion thereof extending around a central axis, a shaft rotatably mounted within the housing and extending along the central axis, the shaft having a threaded outer surface thereof extending along a portion of the shaft from an outer end thereof opposite the housing, a hub having a threaded aperture therein receiving and threaded onto the threaded outer surface of the shaft and means for releasably locking the hub at one of a plurality of possible locations of the hub along the shaft, the shaft having an aperture extending therethrough generally perpendicular to the central axis, the hub having a plurality of slots therein spaced around the threaded aperture therein, the means for releasably locking comprising a pin extending through the aperture in the shaft and an opposite pair of the slots in the hub, the pin having a relatively straight portion extending through the aperture in the shaft and the opposite pair of the plurality of slots in the hub and a curved portion extending outwardly from the straight portion and terminating in an outer curved end resiliently residing in one of the plurality of slots in the hub disposed between the opposite pair of the plurality of slots.

8. In a seed meter having a housing, a method of mounting a seed disk at a desired location within the housing comprising the steps of:
rotatably mounting a shaft within the housing;
positioning a seed disk mounting hub on the shaft so that the seed disk when mounted thereon is at a desired location within the housing; and
securing the hub on the shaft as so positioned;
the step of positioning a seed disk mounting hub on the shaft comprising the steps of:
initially positioning the seed disk mounting hub on the shaft;
mounting the seed disk on the hub so that the seed disk is immovable relative to the hub; and thereafter
advancing the hub along the shaft until the seed disk is at the desired location within the housing.

9. The invention set forth in claim 8, wherein the shaft and the hub are threaded, the step of initially positioning comprises initially threading the hub onto the shaft and the step of advancing the hub comprises rotating the hub relative to the shaft until the seed disk is at the desired location within the housing.

10. The invention set forth in claim 9, wherein the shaft has an aperture therethrough, the hub has an opposite pair of slots therein and the step of securing the hub comprises inserting a pin through the aperture in the shaft and the opposite pair of slots in the hub.

11. In a seed meter comprising a shaft, a housing rotatably mounting the shaft and having a peripheral portion thereof extending around the shaft, a hub mounted on and movable along the shaft and a seed disk having a peripheral portion thereof, a method of locating the peripheral portion of the seed disk a desired distance from the peripheral portion of the housing comprising the steps of:
mounting the seed disk on the hub;
advancing the hub along the shaft in a direction toward the housing to a position in which the peripheral portion of the seed disk is the desired distance from the peripheral portion of the housing; and
securing the hub to the shaft;
and including the further steps of removing the seed disk from the hub following the step of advancing the hub along the shaft and before the step of securing the hub to the shaft, and mounting the seed disk on the hub following the step of securing the hub to the shaft.

12. The invention set forth in claim 11, wherein the shaft has a threaded outer portion, the hub has a threaded inner portion, and the step of advancing the hub along the shaft comprises rotating the threaded inner portion of the hub about the threaded outer portion of the shaft.

13. In a seed meter having a housing with a peripheral portion thereof extending around a central axis and a seed disk, a method of rotatably mounting the seed disk within the housing so that a peripheral portion thereof is a desired distance from the peripheral portion of the housing comprising the steps of:
providing a shaft having a threaded outer portion;
mounting the shaft within the housing for rotation about the central axis;
providing a hub having a threaded aperture therein;
rotating the threaded aperture of the hub onto the threaded outer portion of the shaft to initially mount the hub on the shaft;
mounting the seed disk on the hub;
rotating the hub relative to the shaft to advance the hub and the seed disk along the shaft until the peripheral portion of the seed disk is a desired distance from the peripheral portion of the housing; and
locking the hub on the shaft to prevent rotation of the hub relative to the shaft;
and including the further steps of removing the seed disk from the hub following the step of rotating the hub relative to the shaft to advance the hub and the seed disk and before the step of locking the hub on the shaft, and mounting the seed disk on the hub following locking the hub on the shaft.

14. The invention set forth in claim 13, wherein the shaft has an aperture therethrough, the hub has a plurality of slots therein spaced about the threaded aperture thereof, and the step of locking the hub on the shaft comprises inserting a pin through the aperture in the shaft and an opposite pair of the plurality of slots in the hub.

* * * * *